(12) United States Patent
Uchida

(10) Patent No.: US 8,522,636 B2
(45) Date of Patent: Sep. 3, 2013

(54) RECTILINEAR MOTION DEVICE

(75) Inventor: Toyokazu Uchida, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 238 days.

(21) Appl. No.: 13/129,435

(22) PCT Filed: Mar. 9, 2010

(86) PCT No.: PCT/JP2010/001651
§ 371 (c)(1),
(2), (4) Date: Jun. 13, 2011

(87) PCT Pub. No.: WO2010/103803
PCT Pub. Date: Sep. 16, 2010

(65) Prior Publication Data
US 2011/0239795 A1    Oct. 6, 2011

(30) Foreign Application Priority Data
Mar. 9, 2009   (JP) .................................. 2009-055289

(51) Int. Cl.
*F16H 1/04*    (2006.01)
(52) U.S. Cl.
USPC ............................... 74/422; 74/89.11; 74/413
(58) Field of Classification Search
USPC ..................... 74/409, 411.5, 412 R, 413, 422, 74/89.11, 109
See application file for complete search history.

(56) References Cited

U.S. PATENT DOCUMENTS

| 2,902,875 | A | * | 9/1959 | Finally et al. ................... 74/409 |
| 3,310,998 | A | * | 3/1967 | Harmening ...................... 74/661 |
| 3,512,425 | A | * | 5/1970 | Yoshiaki ................... 74/388 PS |
| 3,850,043 | A | * | 11/1974 | Tarbox ........................... 74/89.2 |

(Continued)

FOREIGN PATENT DOCUMENTS

| CN | 1393320 | 1/2003 |
| DE | 29 17 236 | 11/1979 |

(Continued)

OTHER PUBLICATIONS

International Preliminary Report on Patentability and Written Opinion of the International Searching Authority issued Oct. 27, 2011 in International (PCT) Application No. PCT/JP2010/001651.

(Continued)

*Primary Examiner* — David M Fenstermacher
(74) *Attorney, Agent, or Firm* — Wenderoth, Lind & Ponack, L.L.P.

(57) ABSTRACT

The present invention provides a rectilinear motion device 1 including: a linear rack 13 having a plurality of teeth 13T; a main drive pinion 24 that meshes with the teeth 13T of the rack 13; an auxiliary drive pinion 25 that meshes with the teeth 13T of the rack 13 in a position away from the main drive pinion 24; a main drive motor 22 that rotationally drives the main drive pinion 24; an auxiliary drive motor 23 that rotationally drives the auxiliary drive pinion 25; and a movable carrier 20 to which the main drive motor 22 and the auxiliary drive motor 23 are secured and that moves along the rack 13 with rotational driving of the main drive motor 22 and the auxiliary drive motor 23, wherein the auxiliary drive motor 23 is rotationally driven, in stopping the moving movable carrier 20, in a reverse direction to a driving direction of the main drive motor 22 in motion.

7 Claims, 11 Drawing Sheets

(56) References Cited

U.S. PATENT DOCUMENTS

| | | | |
|---|---|---|---|
| 4,270,404 A | | 6/1981 | Murakoshi et al. |
| 4,341,128 A | * | 7/1982 | Murakoshi et al. ......... 74/490.09 |
| 4,712,408 A | * | 12/1987 | Killop ............................... 72/88 |
| 4,989,472 A | | 2/1991 | James, Sr. et al. |
| 5,187,994 A | * | 2/1993 | Hirai et al. ...................... 74/120 |
| 5,267,478 A | * | 12/1993 | Stridsberg ................... 74/89.17 |
| 5,442,270 A | | 8/1995 | Tetsuaki |
| 5,477,741 A | | 12/1995 | Takenaka et al. |
| 5,546,826 A | | 8/1996 | Yanagisawa |
| 5,613,403 A | * | 3/1997 | Takei ......................... 74/490.09 |
| 5,690,567 A | * | 11/1997 | DeNijs et al. .................... 474/73 |
| 5,823,050 A | * | 10/1998 | Takenaka ........................ 74/116 |
| 5,836,205 A | * | 11/1998 | Meyer .......................... 74/89.17 |
| 6,553,855 B2 | * | 4/2003 | Takahashi et al. ........... 74/89.36 |
| 7,077,621 B2 | * | 7/2006 | Ruden ........................ 414/751.1 |
| 8,322,242 B2 | * | 12/2012 | Gronli .......................... 74/89.27 |
| 2004/0239282 A1 | | 12/2004 | Yoneda |

FOREIGN PATENT DOCUMENTS

| | | |
|---|---|---|
| DE | 195 00 480 | 7/1995 |
| JP | 5-263338 | 10/1993 |
| JP | 6-249312 | 9/1994 |
| JP | 9-257106 | 9/1997 |
| JP | 10-184842 | 7/1998 |
| JP | 10-228317 | 8/1998 |
| JP | 2000-55170 | 2/2000 |
| JP | 2002-21964 | 1/2002 |
| JP | 2002-78383 | 3/2002 |
| JP | 2004-355632 | 12/2004 |
| WO | 96/05453 | 2/1996 |

OTHER PUBLICATIONS

International Search Report issued Jun. 15, 2010 in International (PCT) Application No. PCT/JP2010/001651.
Supplementary European Search Report issued Jul. 4, 2012 in corresponding European Patent Application No. 10750560.4.
Canadian Examiner's Report issued Sep. 19, 2012 in corresponding Canadian Patent Application No. 2,744,181.
Chinese Office Action issued Apr. 22, 2013 in corresponding Chinese Patent Application No. 201080002611.X with English translation.

* cited by examiner

FIG. 8

$$\ddot{\theta} + a\dot{\theta} = bu \qquad \text{EXPRESSION (1)}$$

$\theta$ : ROTATION ANGLE OF MOTOR $\dot{\theta}$ : ROTATION ANGLE SPEED OF MOTOR $$u = \varphi_1 \dot{\theta} + \varphi_2 \theta \qquad \text{EXPRESSION (2)}$$

$$s = \dot{\theta} + c\theta \qquad \text{EXPRESSION (3)}$$

$$\lim_{S \to 0} S\dot{S} < 0 \qquad \text{EXPRESSION (4)}$$

$$\begin{aligned} S\dot{S} &= (\ddot{\theta} + c\dot{\theta})(\dot{\theta} + c\theta) \\ &= (b\varphi_1 + c - a)\dot{\theta}s + b\varphi_2 s\theta < 0 \end{aligned} \qquad \text{EXPRESSION (5)}$$

$$\varphi_1 = \begin{cases} \varphi_1^+ < \dfrac{a-c}{b} & s\dot{\theta} > 0 \\ \varphi_1^- > \dfrac{a-c}{b} & s\dot{\theta} < 0 \end{cases}$$

$$\varphi_2 = \begin{cases} \varphi_2^+ < 0 & s\theta > 0 \\ \varphi_2^- > 0 & s\theta < 0 \end{cases} \qquad \text{EXPRESSION (6)}$$

$$u = \begin{cases} -G_P \cdot \theta & s\theta > 0 \\ G_P \cdot \theta & s\theta < 0 \end{cases} \qquad \text{EXPRESSION (7)}$$

$$I_t = xt \qquad \text{EXPRESSION (8)}$$

$$c = -y \cdot I_t + z \qquad \text{EXPRESSION (9)}$$

FIG. 9

$$I_X \ddot{\theta} + \eta \dot{\theta} = G_{DC}(V_{IN} - \dot{\theta}) + G_{AC} \int (V_{IN} - \dot{\theta}) dt \qquad \text{EXPRESSION (10)}$$

$$\left. \begin{array}{l} I_X \ddot{\omega} + \eta(\dot{\omega} + G_{DC})\dot{\omega} + G_{AC}\omega = G_{AC} V_{IN} \\ \ddot{\omega} + \dfrac{\eta + G_{DC}}{I_X}\dot{\omega} + \dfrac{G_{AC}}{I_X}\omega = \dfrac{G_{AC}}{I_X} V_{IN} \end{array} \right\} \qquad \text{EXPRESSION (11)}$$

$$\left. \begin{array}{l} 2\zeta\omega_n = \dfrac{\eta + G_{DC}}{I_X} \\ \omega_n^2 = \dfrac{G_{AC}}{I_X} \end{array} \right\} \qquad \text{EXPRESSION (12)}$$

$$\ddot{\omega} + 2\zeta\omega_n \dot{\omega} + \omega_n^2 \omega = \omega_n^2 V_{IN} \qquad \text{EXPRESSION (13)}$$

$$2\zeta\omega_n = V_{IN} L^{-1}\left[\dfrac{\omega_n^2}{S^2(S + 2\zeta\omega_n + \omega_n^2)}\right] \qquad \text{EXPRESSION (14)}$$

$$\zeta < 1 \qquad \text{EXPRESSION (15)}$$

$$\left. \begin{array}{l} 1 - e^{-\zeta\omega_n t} \dfrac{1}{\sqrt{1-\zeta^2}} \sin\left(\sqrt{1-\zeta^2}\omega_n t + \varphi\right) = \dfrac{1}{2} \\ \varphi = \tan^{-1} \dfrac{\sqrt{1-\zeta^2}}{\zeta} \end{array} \right\} \qquad \text{EXPRESSION (16)}$$

$$\left. \begin{array}{l} e^{-\zeta\omega_n t}(\zeta\omega_n t + 1) \approx \dfrac{1}{2} \\ \varphi = \zeta\omega_n t \approx 1 + \sqrt{3} \qquad t = \dfrac{2(1+\sqrt{3})}{\eta + G_{DC}} I_X \end{array} \right\} \qquad \text{EXPRESSION (17)}$$

RECTILINEAR MOTION DEVICE

TECHNICAL FIELD

The present invention relates to a rectilinear motion device that converts rotary motion into linear motion to move a carrier.

BACKGROUND ART

A rack and pinion including a rack and a pinion (or a pinion gear) that mesh with each other is known as a conversion device between rotary motion and linear motion. The rack and pinion is used in mechanical devices such as a conveying device, an industrial robot, a machine tool, or a precision machine that require high efficiency, high accuracy, long life, and high driving force transfer.

The rack and pinion generally has a gap called backlash between rack teeth and pinion teeth to avoid jamming of the teeth. However, with the backlash, even if the pinion is stopped, the pinion having inertia moves by an amount of the backlash, thereby reducing positional accuracy in stopping.

Patent Document 1 proposes a conversion device 100 between rotary motion and linear motion that solves the above problem. As shown in FIG. 11, the conversion device 100 converts between rotary motion and linear motion using a rack 105 including teeth 104 having a shape of a plurality of trochoidal curves, and a pinion 107 including a plurality of rollers 106 that mesh with the teeth 104. Each tooth 104 has such a shape that a bottom of the tooth substantially forms an arc having a diameter larger than that of a roller 106 so that a central locus of the roller 106 that meshes with the rack 105 makes a trochoidal curve. The rack 105 and the pinion 107 are preloaded and used. Further, an approach gradually away from an outer locus of the roller 106 is formed at an end of the tooth 104.

CITATION LIST

Patent Document

Patent Document 1: Japanese Patent Laid-Open No. 10-184842

SUMMARY OF INVENTION

Problems to be Solved by the Invention

However, Patent Document 1 has a problem in machining accuracy due to machining of the tooth shape of the rack 105 into the trochoidal curve, or the like, which increases cost. In particular, if an expensive rack is formed to be long for long distance conveyance, it is difficult to achieve both machining accuracy and appropriate cost.

The present invention is achieved in view of such a problem, and has an object to provide a rectilinear motion device that can achieve high positional accuracy in stopping without using a gear with an expensive shape.

Solution to the Problems

In order to achieve the object, the present invention provides a rectilinear motion device including a pair of motors independently driven for one gear driving rack. A pinion is mounted to each motor. One of the pair of motors is a main drive motor, and the other is an auxiliary drive motor. The main drive motor and the auxiliary drive motor are rotated and driven in the same direction in motion, but a driving force is applied to the auxiliary drive motor in stopping in a reverse rotational direction to that of a driving force applied to the main drive motor. This reduces motion (lost motion) of the pinion due to backlash and allows positioning with high accuracy.

Specifically, the rectilinear motion device according to the present invention includes: a linear rack having a plurality of teeth; a main drive pinion that meshes with the teeth of the rack; an auxiliary drive pinion that meshes with the teeth of the rack in a position away from the main drive pinion; a main drive motor that rotationally drives the main drive pinion; an auxiliary drive motor that rotationally drives the auxiliary drive pinion; and a carrier to which the main drive motor and the auxiliary drive motor are secured and that linearly moves along the rack with rotational driving of the main drive motor and the auxiliary drive motor. The rectilinear motion device according to the present invention is characterized in that the auxiliary drive motor is rotationally driven, in stopping the moving carrier, in a reverse direction to a driving direction of the main drive motor in motion. In the present invention, between the two motors, the motor rotationally driven in the reverse direction is defined as the auxiliary drive motor.

In the rectilinear motion device of the present invention, both the main drive motor and the auxiliary drive motor can be driven from start to stop of motion of the carrier, but not limited to this. Specifically, in the present invention, driving of the auxiliary drive motor may be stopped after the carrier starts the motion and reaches uniform motion. Also in this case, in stopping the carrier, the auxiliary drive motor is rotationally driven in the reverse direction to the driving direction of the main drive motor in motion. This can simplify control of the main drive motor and the auxiliary drive motor.

In the rectilinear motion device of the present invention, when both the main drive motor and the auxiliary drive motor are driven from start to stop of the motion of the carrier, the main drive motor and the auxiliary drive motor are preferably controlled by sliding mode control for positioning with high accuracy and a high holding force. In the sliding mode control, a deviation position and a speed to a final arrival position provide a hyperplane, thereby allowing positioning with any control force. In this case, in order to increase a holding force after positioning, a motor control force may be switched within such a controllable range that does not cause vibration.

In the rectilinear motion device of the present invention, when both the main drive motor and the auxiliary drive motor are driven from start to stop of the motion of the carrier, the main drive motor and the auxiliary drive motor are preferably controlled by the sliding mode control for positioning with high accuracy as described above. However, operating in a sliding mode in the entire range increases a load on the motors. Thus, it is preferable to predict a motor load from a starting characteristic in starting the motors (for example, a rise time in driving the motors), and provide a hyperplane or an inclination of a switching line suitable for the motor load, thereby controlling the driving force of each motor.

Advantageous Effects of Invention

According to the rectilinear motion device of the present invention, when the moving carrier is stopped, the auxiliary drive motor can be rotationally driven in the reverse direction to the direction of the main drive motor in motion. This reduces lost motion due to backlash and allows positioning of the carrier with high accuracy. Further, since the rectilinear motion device of the present invention allows positioning of the carrier with high accuracy assuming backlash, an involute spur gear or a helical gear for general purpose use can be used as a pinion, thereby reducing cost of the device. Further, the rectilinear motion device of the present invention includes the two motors, thereby allowing positioning with high accuracy while generating a large driving force.

BRIEF DESCRIPTION OF DRAWINGS

FIG. 8 shows mathematical expressions explaining a sliding mode.

FIG. 9 shows different mathematical expressions explaining the sliding mode.

DESCRIPTION OF EMBODIMENTS

Figure 1:
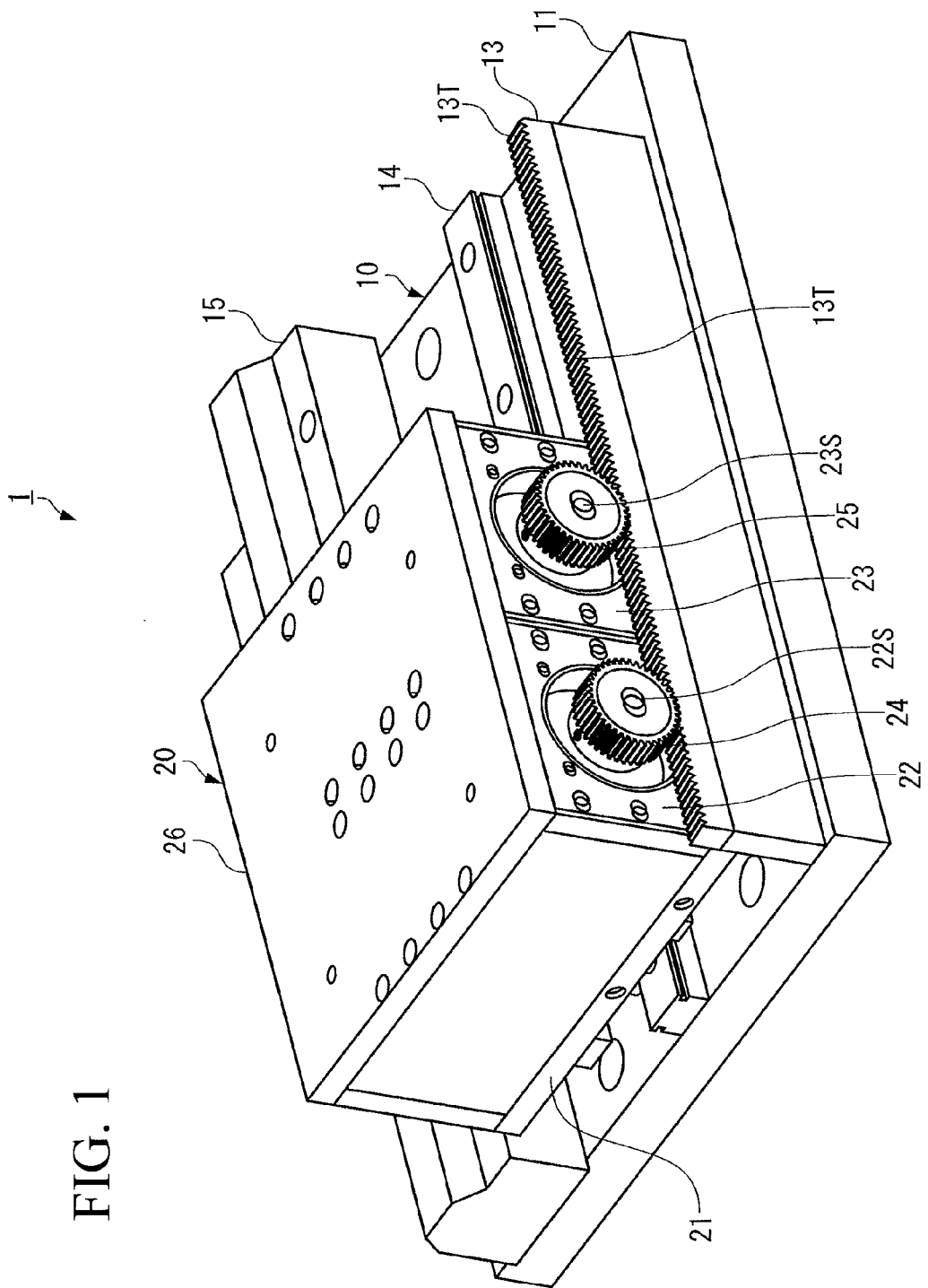
FIG. 1 is a perspective view of a rectilinear motion device according to this embodiment.
Figure 2:
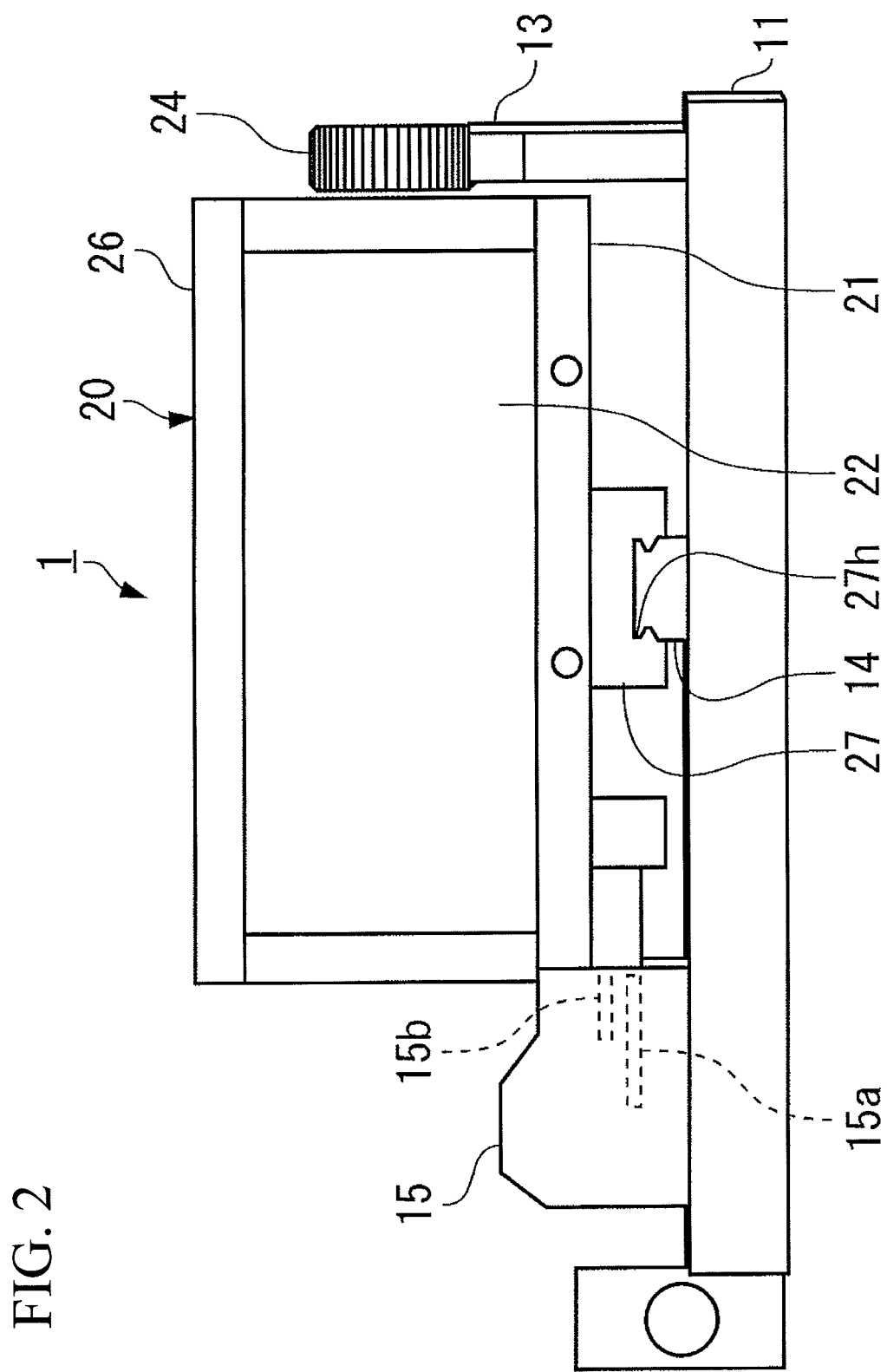
FIG. 2 is a front view of the rectilinear motion device according to this embodiment.
Figure 3:
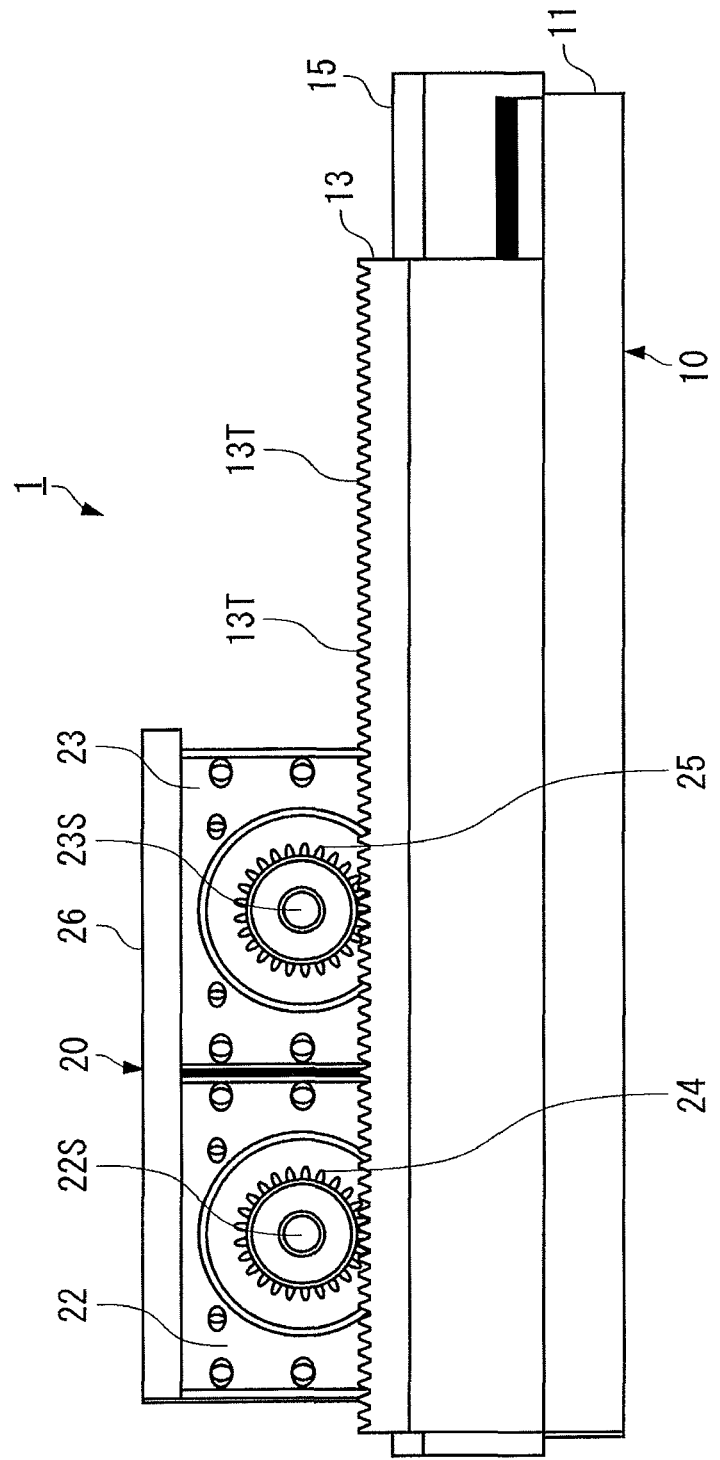
FIG. 3 is a side view of the rectilinear motion device according to this embodiment.

Now, the present invention will be described in detail based on an embodiment shown in the accompanying drawings.

A rectilinear motion device 1 according to this embodiment includes a rack and pinion as a basic configuration.

The rectilinear motion device 1 is configured so that a movable carrier 20 can linearly reciprocate on a stage 10 and stop in any position.

The stage 10 includes a rectangular base plate 11, a rack 13 provided on the base plate 11 and extending in a direction of the movable carrier 20 linearly reciprocating, a rail 14 extending in parallel with the rack 13, and a linear encoder 15 extending in parallel with the rail 14.

The rack 13 has a plurality of teeth 13T continuously provided in a longitudinal direction of the rack 13. The teeth 13T of the rack 13 each have a linear shape.

The rail 14 is slidably fitted to a slider 27 of the movable carrier 20, and supports a load of the movable carrier 20 via the slider 27.

As the linear encoder 15, an optical linear encoder 15 may be used. The optical linear encoder 15 includes, for example, a glass scale 15a, and a slider unit 15b that scans the glass scale 15a and obtains position information. The obtained position information is sent to a controller 30 described later. The glass scale 15a is laid in the linear encoder 15, and the slider unit 15b is integrated with the movable carrier 20 and scans on the glass scale 15a. The linear encoder 15 is used for identifying a position of the movable carrier 20, and a magnetic linear encoder may be used. Also, a device that can identify a position of a linearly moving movable carrier 20 may be used instead of the linear encoder 15. For example, means may be widely used that can identify a position with necessary accuracy such as a rotary encoder that obtains position information using rpms of a main drive motor 22 and an auxiliary drive motor 23, a laser displacement gauge, or image processing of a target mark.

The movable carrier 20 includes a carrier lower plate 21, the main drive motor 22 and the auxiliary drive motor 23 placed on the carrier lower plate 21 and secured by appropriate means, a main drive pinion 24 secured to an output shaft 22S of the main drive motor 22, and an auxiliary drive pinion 25 secured to an output shaft 23S of the auxiliary drive motor 23. As the main drive motor 22 and the auxiliary drive motor 23, for example, a direct drive servomotor (DD motor) can be used. The main drive motor 22 and the auxiliary drive motor 23 preferably have the same characteristic in view of simplification of control. Both the main drive pinion 24 and the auxiliary drive pinion 25 are gears (involute gears) having a tooth shape of an involute curve, and mesh with the rack 13 on the stage 10.

A carrier upper plate 26 is placed on upper surfaces of the main drive motor 22 and the auxiliary drive motor 23, and the carrier upper plate 26 is secured to both the main drive motor 22 and the auxiliary drive motor 23. Thus, the carrier lower plate 21, the main drive motor 22, the auxiliary drive motor 23, and the carrier upper plate 26 are integrally configured.

To a lower surface of the carrier lower plate 21, the slider 27 is secured in a position corresponding to the rail 14 of the stage 10. The slider 27 has, in a lower surface, a fitting groove 27h extending in parallel with a motion direction of the movable carrier 20, and the fitting groove 27h and a tip of the rail 14 fit each other. The slider 27 is slidable along the rail 14 while fitting the tip of the rail 14.

Figure 4:
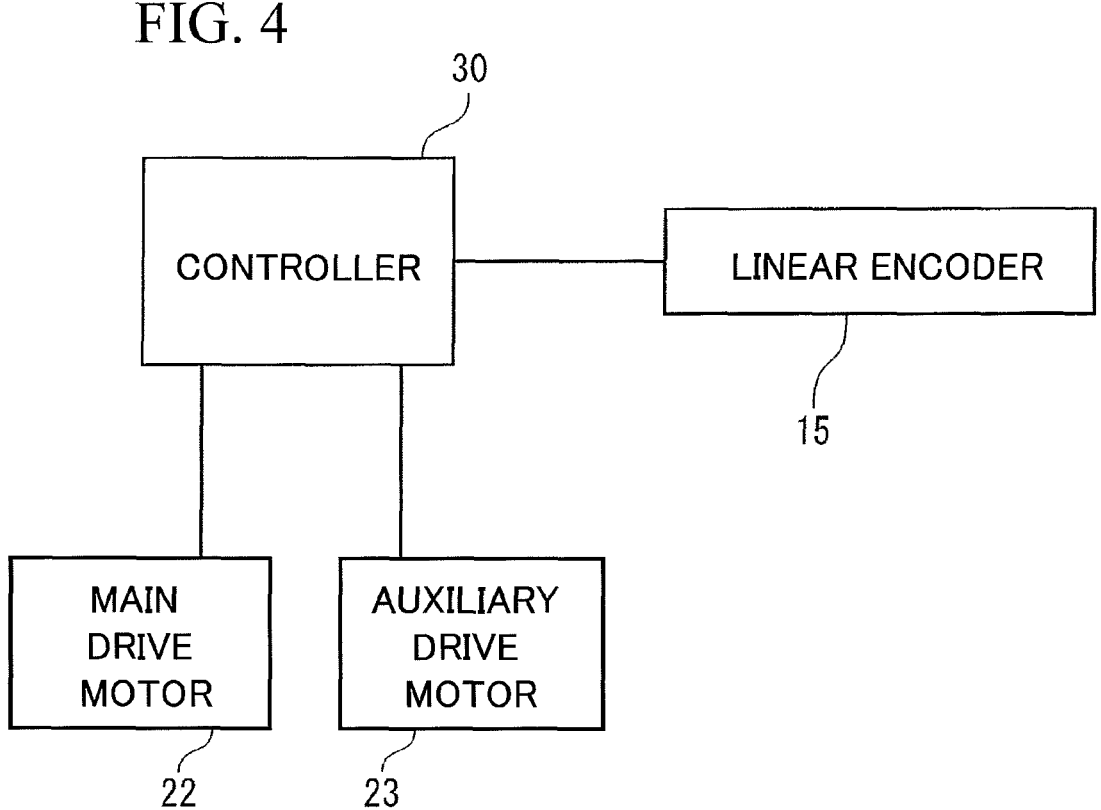
FIG. 4 is a control block diagram of the rectilinear motion device according to this embodiment.

The above-mentioned rectilinear motion device 1 includes, as shown in FIG. 4, a controller 30 that controls an operation of the movable carrier 20 (main drive motor 22, auxiliary drive motor 23).

The controller 30 obtains position information of the movable carrier 20 from the linear encoder 15, and controls rotational driving of the main drive motor 22 and the auxiliary drive motor 23 provided in the movable carrier 20 based on the obtained position information, thereby controlling motion and stop of the movable carrier 20.

To move the movable carrier 20, the controller 30 instructs the main drive motor 22 and the auxiliary drive motor 23 to rotate in the same direction. Then, the main drive pinion 24 mounted to the main drive motor 22 and the auxiliary drive pinion 25 mounted to the auxiliary drive motor 23 rotate in the same direction, and the movable carrier 20 linearly moves while being guided by the rail 14. The movable carrier 20 moves rightward when the main drive motor 22 and the auxiliary drive motor 23 rotate clockwise whereas the movable carrier 20 moves leftward when the main drive motor 22 and the auxiliary drive motor 23 rotate counterclockwise.

Figure 5:
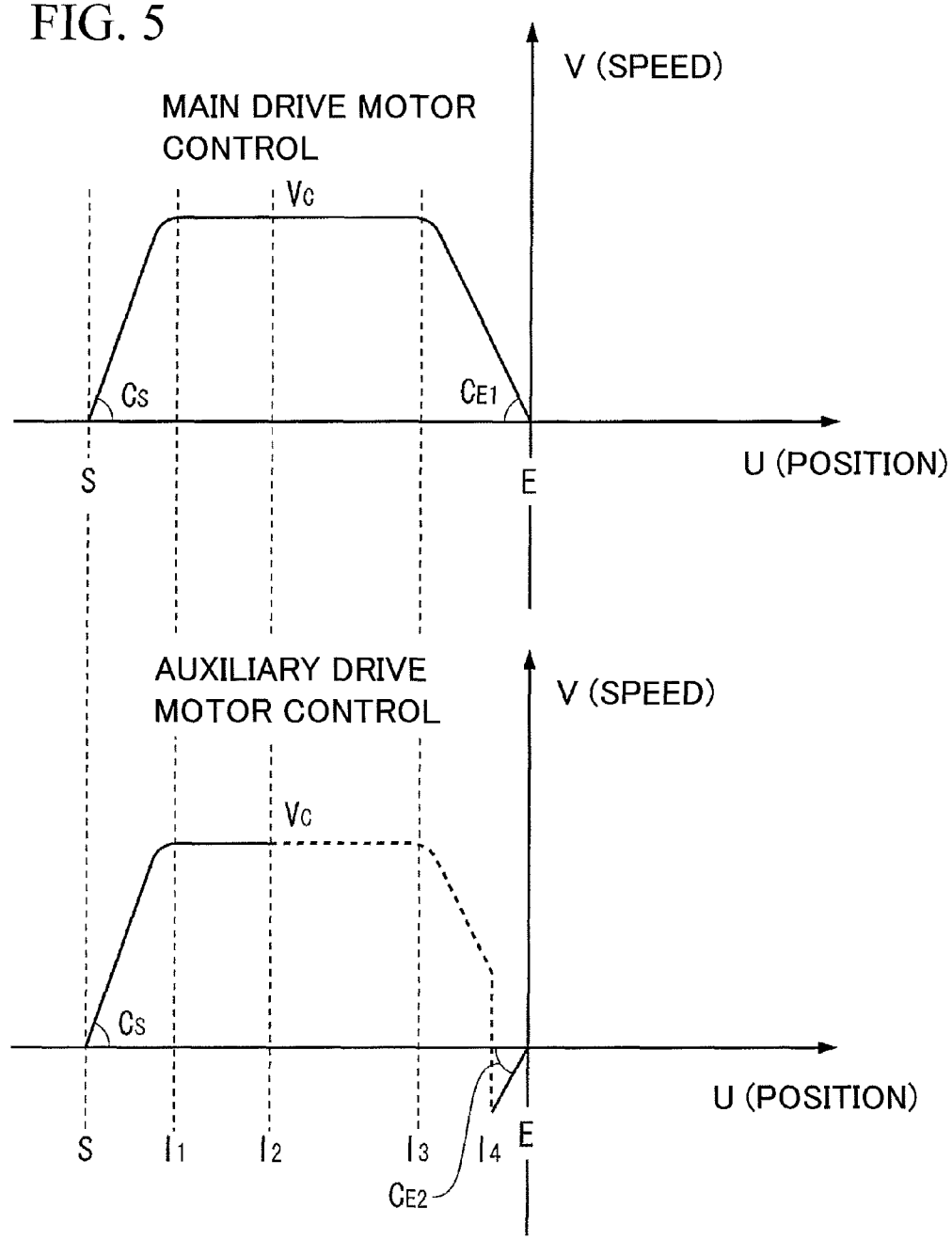
FIG. 5 shows a position-speed curve of a main drive motor and an auxiliary drive motor when a movable carrier is moved from a position S to a position E in the rectilinear motion device according to this embodiment.

FIG. 5 shows a position-speed curve of the main drive motor 22 and the auxiliary drive motor 23 when the movable carrier 20 is moved from a position S to a position E on the rail 14. In FIG. 5, solid lines show that the main drive motor 22 and the auxiliary drive motor 23 are driven, and a dotted line shows that the auxiliary drive motor 23 is not driven.

When the controller 30 gives an instruction to drive, the main drive motor 22 and the auxiliary drive motor 23 simultaneously start rotation (this rotational direction is forward rotation), and along therewith, the movable carrier 20 starts motion. Since a large driving force is required at the start of the motion, the main drive motor 22 and the auxiliary drive motor 23, that is, the two motors are driven.

When the movable carrier 20 reaches a speed Vc and reaches a position $I_1$, then the controller 30 controls driving of the main drive motor 22 and the auxiliary drive motor 23 so as to cause uniform motion of the movable carrier 20 at the speed Vc. The controller 30 identifies the position of the movable carrier 20 based on the position information of the movable carrier 20 received from the linear encoder 15. The controller 30 stops driving the auxiliary drive motor 23 when the auxiliary drive motor 23 reaches a position $I_2$, and moves the movable carrier 20 using one main drive motor 22. This is because a smaller driving force than at the start of the motion enables the uniform motion of the movable carrier 20 at the speed Vc. When the driving force is lost, the auxiliary drive motor 23 is displaced by an amount of backlash, and idles with the motion of the movable carrier 20 because the auxiliary drive pinion 25 meshes with the teeth 13T of the rack 13 on a surface opposite to that in driving.

When the movable carrier 20 reaches a position $I_3$, the controller 30 instructs the main drive motor 22 in driving to reduce the speed so that the movable carrier 20 stops in the position E. The position $I_3$ and an inclination $C_{E1}$ indicating a degree of deceleration are set based on the position $I_1$ where the movable carrier 20 reaches the speed Vc after starting the motion and an inclination $C_S$ indicating a degree of acceleration.

When the movable carrier 20 reaches a position $I_4$, the controller 30 instructs to apply, to the auxiliary drive motor 23 in idling but not driving, a driving force in a reverse rotation to a driving force applied to the main drive motor 22. The position $I_4$ and an inclination $C_{E2}$ indicating a degree of acceleration are determined based on the position $I_3$ and $C_{E1}$, and $C_{E2}$ is typically $C_{E2} \leq -C_{E1}$. If vibration (slip) after the stop is allowed, rough positioning with the main drive motor 22 may be performed and then the auxiliary drive motor 23 may be moved to perform final positioning.

Figure 6:
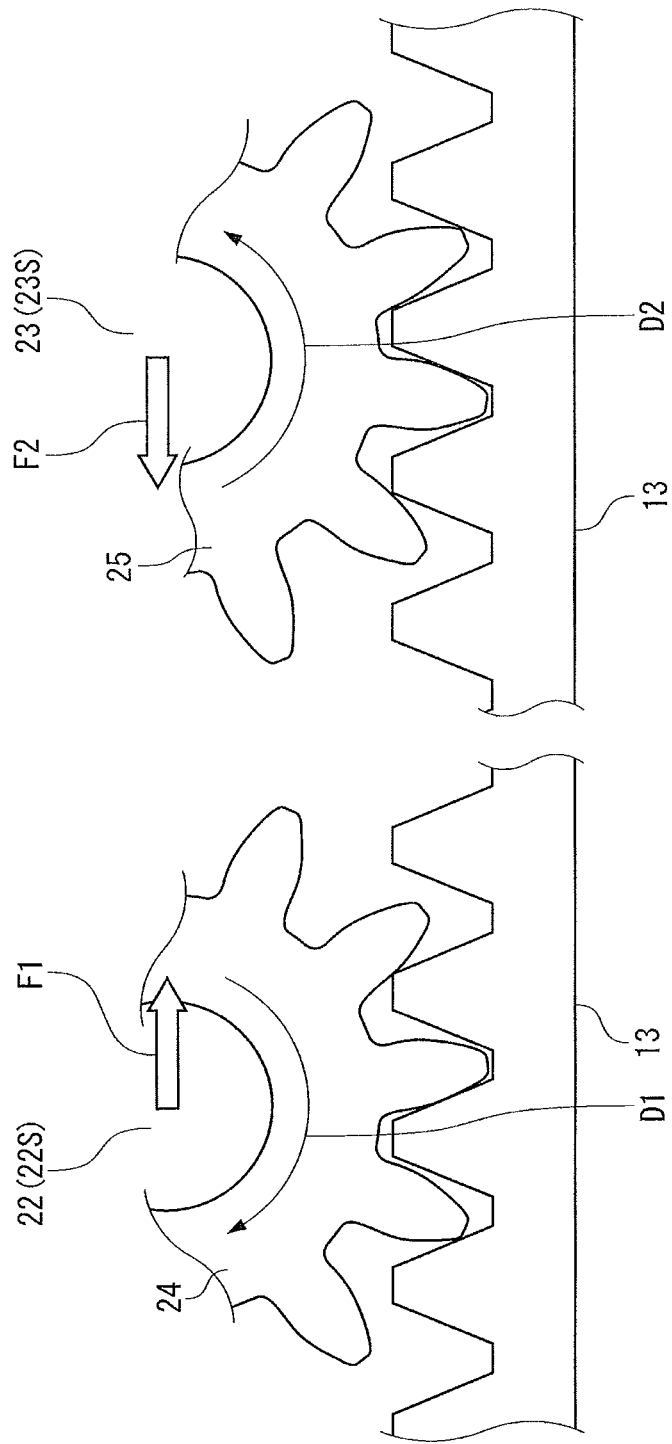
FIG. 6 is a partial enlarged view of a rack and pinion in the rectilinear motion device according to this embodiment.

FIG. 6 shows states of the main drive pinion 24 and the auxiliary drive pinion 25 when the driving force in the reverse rotation is applied to the auxiliary drive motor 23.

A driving force D1 of forward rotation (clockwise arrow) is applied to the main drive pinion 24, and a driving force D2 of reverse rotation (counterclockwise arrow) is applied to the auxiliary drive pinion 25. Thus, the main drive pinion 24 (main drive motor 22) receives a rightward force F1 in FIG. 6 from the rack 13, and the auxiliary drive pinion 25 (auxiliary drive motor 23) receives a leftward force F2 in FIG. 6 from the rack 13. The force F1 and the force F2 are in opposite directions.

In view of only the main drive pinion 24, even if the driving force of the main drive motor 22 is stopped to stop rotation of the main drive pinion 24, there is backlash between the main drive pinion 24 and the rack 13, and the movable carrier 20 is moved by inertia by an amount of the backlash, thereby preventing positioning in the position E with high accuracy. This is the same when both the auxiliary drive motor 23 and the main drive motor 22 are rotated forward.

In contrast to this, for the movable carrier 20 in this embodiment, even if there is backlash between the main drive pinion 24 and the rack 13 and further between the auxiliary drive pinion 25 and the rack 13, the main drive pinion 24 and the auxiliary drive pinion 25 receive the forces in the opposite directions, thereby preventing the movable carrier 20 from being moved after the stop. Thus, the rectilinear motion device 1 can position the movable carrier 20 in the position E with high accuracy even using involute gears for general purpose use as the main drive pinion 24 and the auxiliary drive pinion 25. Further, in the rectilinear motion device 1, the movable carrier 20 includes the two motors, thereby providing a large driving force and allowing positioning with high accuracy.

Figure 7:
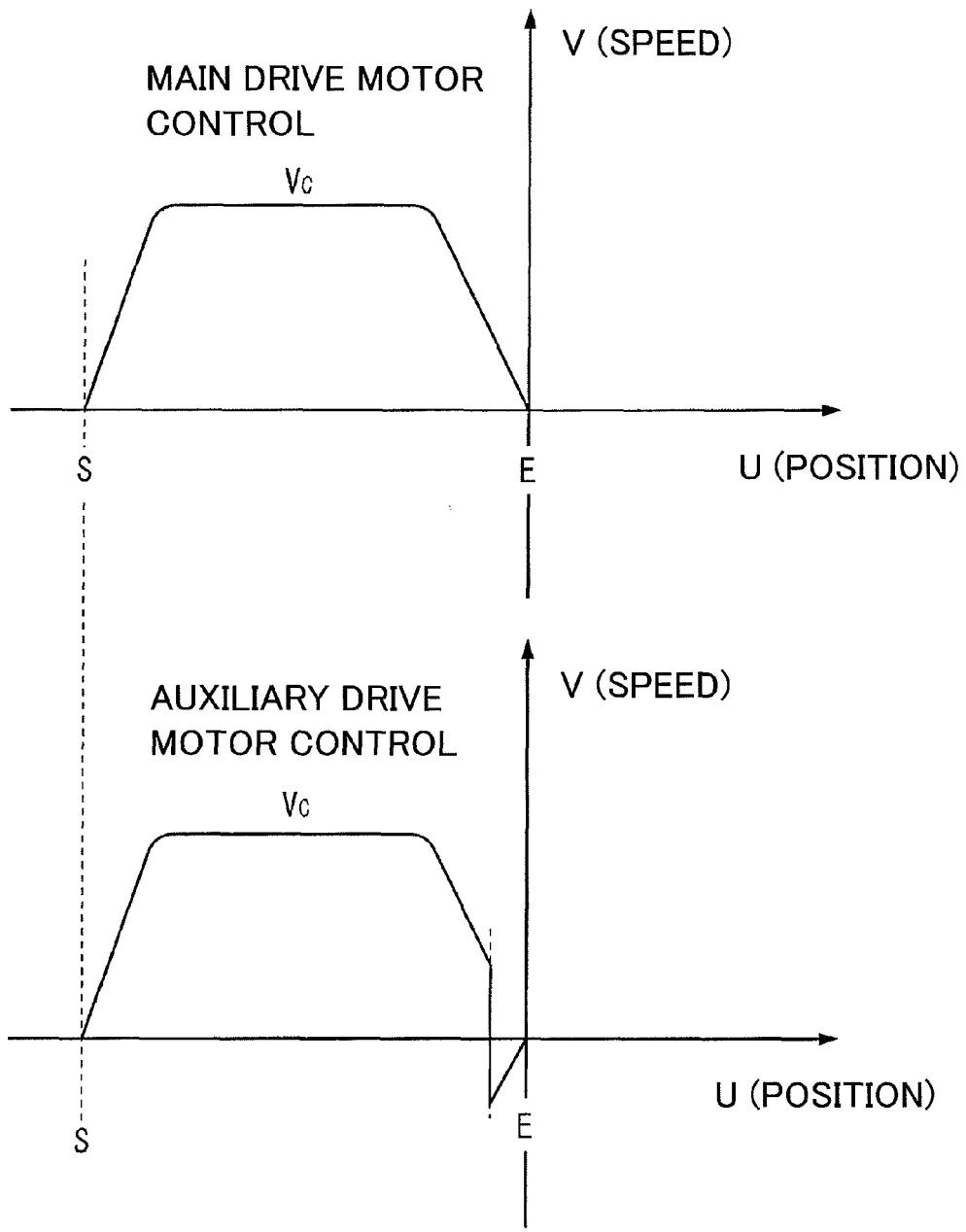
FIG. 7 shows a position-speed curve of the main drive motor and the auxiliary drive motor when the movable carrier is moved from the position S to the position E in the rectilinear motion device according to this embodiment.

In the above, control is performed so as not to apply the driving force to the auxiliary drive motor 23 from the position $I_2$ to the position $I_4$. This control does not involve control of the driving force from forward rotation to reverse rotation to the auxiliary drive motor 23, thus having the advantage of simplicity. However, the present invention is not limited to the control shown in FIG. 5. For example, as shown in FIG. 7, the driving force may be applied to both the main drive motor 22 and the auxiliary drive motor 23 over the entire process from the position S to the position E. The control in this case is preferably based on a sliding mode in view of positioning with high accuracy. Now, the sliding mode control will be described.

In a variable structure system (VSS) that is robust against parameter changes, a control structure can be discontinuously switched to obtain a desired property. Sliding mode control can be performed based on the VSS theory, has a characteristic that a control system is simple but robust against property changes of a control target, and is a low-dimensional method. The sliding mode control is applied to the positioning of the main drive motor 22 and the auxiliary drive motor 23, thereby allowing positioning control with high accuracy that is robust against load changes with little overshoot.

A control structure of a DD motor is expressed by Expression (1). Expressions (1) to (9) are shown in FIG. 8.

In Expression (1), u denotes a control input of the motor and is expressed by Expression (2). When a hyperplane is expressed by Expression (3), Expression (5) needs to be satisfied in order to satisfy Expression (4) that is an existence condition of the sliding mode control. When Expression (6) is introduced into Expression (5), a condition for reaching the hyperplane s=0 and the existence condition of the sliding mode can be simultaneously satisfied.

Since the speed is input to the DD motor, proportional control of the position may be performed according to Expression (7) as control.

Figure 10:
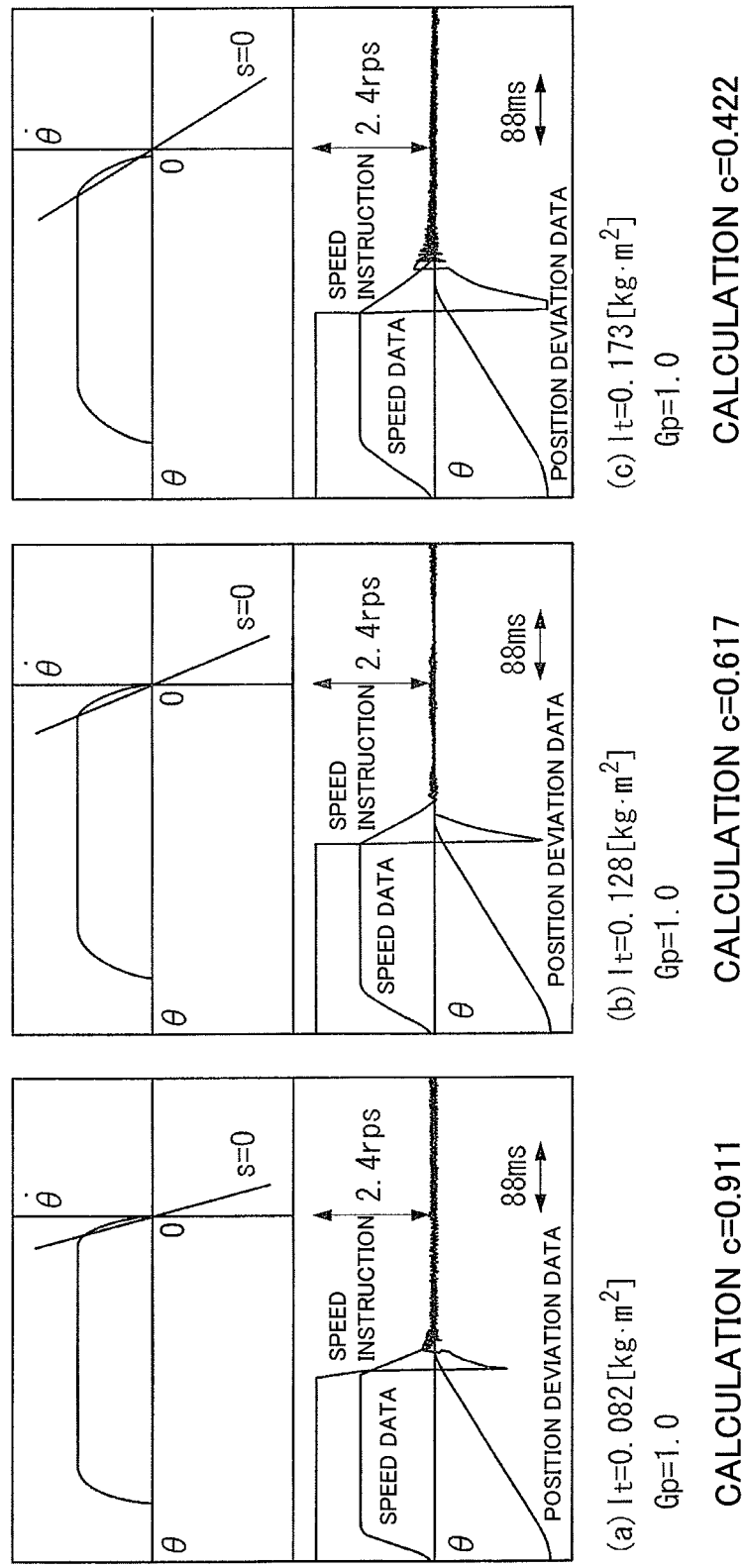
FIG. 10 shows an example of adaptive sliding mode control.
Figure 11:
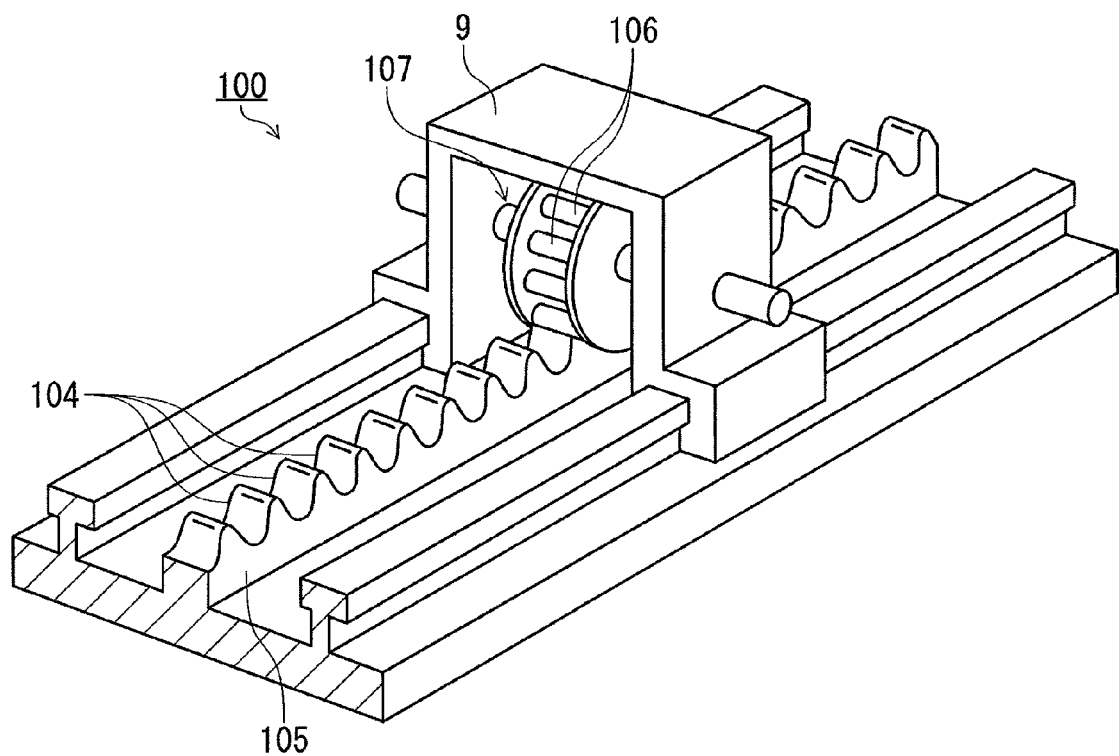
FIG. 11 shows a conversion device between rotary motion and linear motion disclosed in Patent Document 1.

From the inventor's study, appropriately setting the inclination c of the switching line s allows positioning with little overshoot and low residual vibration. A relationship between the inclination c and the load is herein simply approximated to a linear function, and c is determined by load identification. A relationship between the load and the inclination c is expressed as in Expressions (8) and (9). Expressions (8) and (9) can be referred to as an adaptive sliding mode. Thus, positioning can be performed without overshoot as shown in FIG. 10, although an approximation error occurs since the relationship between the load and the inclination c is approximated to the linear function. Further, positioning can be performed even with a position gain of 10 times, thereby providing high rigidity. As such, appropriately selecting the inclination of the switching line allows control that is less influenced by load changes.

When a servo driver is a PI control system (PI control: a control method of a combination of a proportional action and an integral action) in the adaptive sliding mode, Expression (10) is obtained where $I_x$ is moment of inertia, $\eta$ is coefficient of viscosity, $G_{DC}$ is DC gain, $G_{AC}$ is AC gain, and $V_{IN}$ is input speed. Expression (10) and thereafter are shown in FIG. 9.

Expression (11) is obtained when a rotation angle of the motor is $\omega$ and $\omega$ is once differentiated.

With Expression (12), Expression (13) is obtained.

When Expression (13) is Laplace transformed to calculate $\omega(t)$, Expression (14) is obtained. $L^{-1}$ indicates Laplace transform.

Among solutions of Expression (14), in the case of Expression (15), a time when the speed becomes half a target speed is calculated as in Expression (16).

When Expression (16) is solved and approximated, Expression (17) is obtained. Specifically, the time when the speed becomes half the input speed is proportional to the moment of inertia $I_x$. Thus, as shown in Expressions (8) and (9), measuring a rise time of the motor, predicting an inertial load according to the time, and providing an optimum switching line condition of a hyperplane is a simple method, but is important in terms of optimum control.

The present invention has been described above based on the embodiment, but the present invention is not limited to the embodiment. For example, it is described that the main drive motor 22 and the auxiliary drive motor 23 have the same property, but even if the main drive motor 22 and the auxiliary drive motor 23 have different properties, control in view of the different properties is performed for each of the motors, thereby obtaining the advantage of the present invention. For example, an encoder with high resolution may be used for the main drive motor 22, a reducer with a higher reduction ratio may be used for the auxiliary drive motor 23 than that for the main drive motor 22, and various configurations may be selected in view of required positioning resolution or properties. In reverse, a direct drive method may be adopted for the auxiliary drive motor 23 with a motor that does not use a reducer.

The utility form of the rectilinear motion device 1 is not limited, but the rectilinear motion device 1 may be widely applied to a conveying device, an industrial robot, a machine tool, a precision machine, or the like. In this case, two rectilinear motion devices 1 may be placed on each other so that motion directions of movable carriers 20 thereof are orthogonal to each other, and a device can be configured that is movable along two axes orthogonal to each other.

Further, the configurations in the embodiment above may be changed or deleted as appropriate without departing from the gist of the present invention. For example, it is easy to use three or more motors and increase a driving force by the number of motors in use, thereby achieving both the driving force and accuracy.

REFERENCE SIGNS LIST 1 rectilinear motion device
10 stage
13 rack
13T tooth
15 linear encoder
20 movable carrier
22 main drive motor
23 auxiliary drive motor
24 main drive pinion
25 auxiliary drive pinion
30 controller

The invention claimed is:

1. A rectilinear motion device comprising:
a linear rack having a plurality of teeth;
a main drive pinion that meshes with the rack;
an auxiliary drive pinion that meshes with the rack in a position away from the main drive pinion;
a main drive motor that rotationally drives the main drive pinion;
an auxiliary drive motor that rotationally drives the auxiliary drive pinion; and
a carrier to which the main drive motor and the auxiliary drive motor are secured and that linearly moves along the rack with rotational driving of the main drive motor and the auxiliary drive motor,
wherein the auxiliary drive motor is rotationally driven, in stopping the moving carrier, in a reverse direction to a driving direction of the main drive motor in motion.

2. The rectilinear motion device according to claim 1, wherein driving of the auxiliary drive motor is stopped after the carrier starts the motion and reaches uniform motion.

3. The rectilinear motion device according to claim 1, wherein driving forces of the main drive motor and the auxiliary drive motor are controlled by sliding mode control.

4. The rectilinear motion device according to claim 3, wherein the driving forces of the main drive motor and the auxiliary drive motor are controlled by predicting a motor load connected to each of the motors based on a rise time in driving the motors, and providing a hyperplane or an inclination of a switching line for condition determination by the sliding mode control.

5. The rectilinear motion device according to claim 1, wherein the main drive pinion and the auxiliary drive pinion are involute spur gears.

6. The rectilinear motion device according to claim 1, further comprising:
a rail extending in parallel with the rack; and
a linear encoder extending in parallel with the rail for identifying a position of the carrier.

7. The rectilinear motion device according to claim 6, further comprising a controller,
wherein the controller controls motion and stop of the main drive motor and the auxiliary drive motor based on position information of the carrier obtained from the linear encoder.

* * * * *